(12) United States Patent
Delaby et al.

(10) Patent No.: US 11,996,907 B2
(45) Date of Patent: May 28, 2024

(54) METHOD AND APPARATUS FOR DETERMINING THE LOCATION OF IMPAIRMENTS ON A LINE OF A WIRED NETWORK

(71) Applicant: Nokia Solutions and Networks Oy, Espoo (FI)

(72) Inventors: Olivier Delaby, Loyers (BE); Nicolas Dupuis, Chaudfontaine (BE); Axel Van Damme, Loyers (BE)

(73) Assignee: Nokia Solutions and Networks Oy, Espoo (FI)

( * ) Notice: Subject to any disclaimer, the term of this patent is extended or adjusted under 35 U.S.C. 154(b) by 139 days.

(21) Appl. No.: 17/858,882

(22) Filed: Jul. 6, 2022

(65) Prior Publication Data
US 2023/0035180 A1    Feb. 2, 2023

(30) Foreign Application Priority Data

Jul. 16, 2021 (EP) .................................. 21186261

(51) Int. Cl.
*H04B 3/48* (2015.01)
*H04B 3/487* (2015.01)
*H04B 17/10* (2015.01)

(52) U.S. Cl.
CPC ............... *H04B 3/48* (2013.01); *H04B 3/487* (2015.01); *H04B 17/101* (2015.01)

(58) Field of Classification Search
CPC ........ H04B 3/48; H04B 3/487; H04B 17/101; H04B 3/46; H04L 41/0677; H04L 41/145; G06N 3/08

See application file for complete search history.

(56) References Cited

U.S. PATENT DOCUMENTS

| | | | | |
|---|---|---|---|---|
| 8,395,373 | B2* | 3/2013 | Akke | G01R 15/183 324/726 |
| 8,862,215 | B2* | 10/2014 | Puolakanaho | G16H 20/30 324/649 |
| 2017/0063429 | A1* | 3/2017 | Flask | H04Q 5/00 |
| 2019/0053072 | A1* | 2/2019 | Kundargi | H04W 16/28 |
| 2019/0274108 | A1* | 9/2019 | O'Shea | H04W 72/0453 |

* cited by examiner

*Primary Examiner* — Giovanni Astacio-Oquendo
*Assistant Examiner* — Zannatul Ferdous
(74) *Attorney, Agent, or Firm* — Harness, Dickey & Pierce, P.L.C.

(57) ABSTRACT

Embodiments of the present disclosure relate to an apparatus including means configured to perform: obtaining a measured channel frequency response, and a measured noise power spectral density for a line of a wired network susceptible to an impairment; deriving, in case of an indication of an impairment present on the line, from the measured channel frequency response and the measured noise power spectral density, a first theoretical noise representation for the line with the impairment and a second theoretical noise representation for the line without the impairment; and determining information indicative of a location of the impairment in the line, by processing the measured noise power spectral density, the first theoretical noise representation, and the second theoretical noise representation with a neural network.

14 Claims, 11 Drawing Sheets

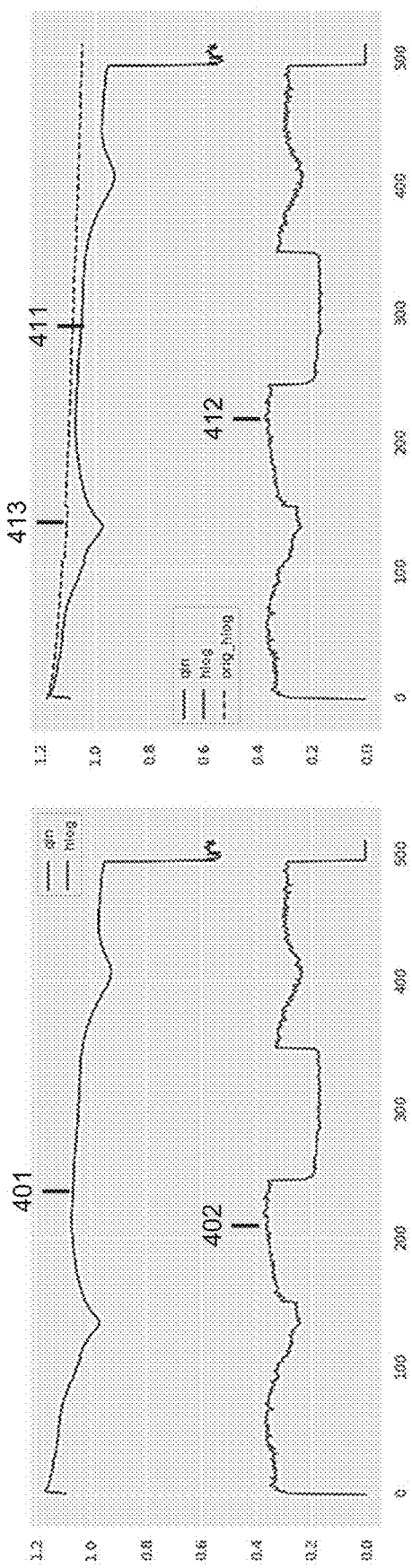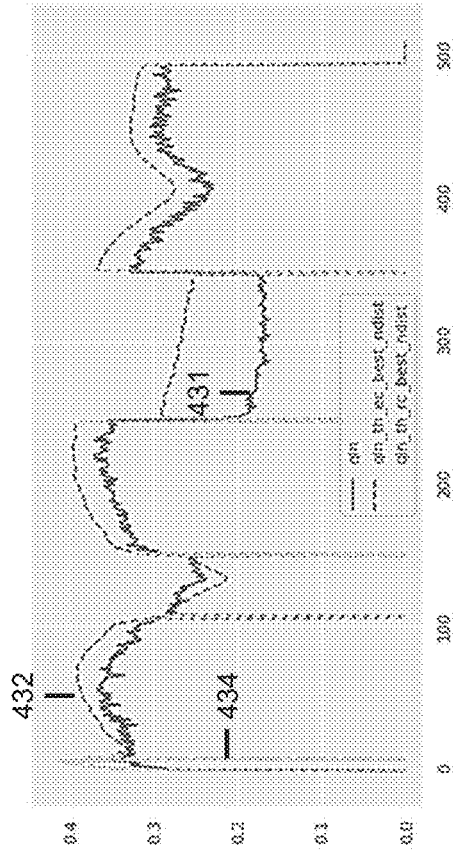
FIG.4B
FIG.4C
FIG.4A

METHOD AND APPARATUS FOR DETERMINING THE LOCATION OF IMPAIRMENTS ON A LINE OF A WIRED NETWORK

CROSS-REFERENCE TO RELATED APPLICATIONS

This application claims priority to and the benefit of European Patent Application No. 21186261.0 filed on Jul. 16, 2021, the entire contents of each of which are incorporated herein by reference.

TECHNICAL FIELD

Various example embodiments relate to a method and apparatus for determining the location of impairment on a line of a wired network.

BACKGROUND

Wired networks such as telecommunication subscriber networks or others may experience physical layer impairments that result in service degradation, service interruption, poor quality of subscriber experience, and so on. For example, a poor connection between one or more electrical wires in a copper network can impair or sometimes prevent transmission of electrical signals along a subscriber line of a network. Additionally, depending on its location, the presence of impairment on one line may have an impact on other lines, thus impacting the subscriber experience on these other lines. The physical layer is thus known to be the bottleneck for the Quality of Service, QoS, for wired networks. When service interruption is not allowed, physical impairments in wired networks are challenging to locate and monitor. Further, with the ever more increasing QoS demand by the subscribers, physical impairments need not only be detected and but also located with high accuracy to allow dispatching a technician at the right place when required, with the aim to ultimately improve the maintenance costs and intervention time.

SUMMARY

It is an object of embodiments of the present disclosure to provide a solution capable of determining the location of a physical impairment present on a line of a wired network with high accuracy. It is a further object of embodiments of the present disclosure to provide a solution capable of remotely detecting a physical impairment and remotely determining its location without interrupting the service.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by an apparatus as defined by claim 1. In particular, the apparatus comprises means configured to perform:
  obtaining a measured channel frequency response, and a measured noise power spectral density for a line of a wired network susceptible to an impairment;
  deriving, in case of an indication of an impairment present on the line, from the measured channel frequency response and the measured noise power spectral density, a first theoretical noise representation for the line with the impairment and a second theoretical noise representation for the line without the impairment; and
  determining information indicative of a location of the impairment in the line, by processing the measured noise power spectral density, the first theoretical noise representation, and the second theoretical noise representation with a neural network.

In other words, the method uses a neural network to determine the location of an impairment based on the measured noise power spectral density and a first theoretical noise representation for the line with the impairment and a second theoretical representation for the line without the impairment. The first and second theoretical representations are derived based on the measured channel frequency response and the measured noise power spectral density. The channel frequency response and noise power spectral density are measurements that are performed by the network devices connected to the respective lines of the wired network. The channel frequency response is sensitive to any impairments, or any unexpected topological configuration observed on a line. The effect of the impairments on the channel frequency response is observed in the form of patterns, such as dips, deforming the channel frequency response. However, the noise power spectral density is also affected by the impairments although to a lesser extent, similar patterns are also observed but to a different extend. Thus, deriving the theoretical noise representation based on both the measured channel frequency response and the measured noise power spectral density allows not only the capture of the similarities between the channel frequency response and the noise power spectral density but to derive noise representation in which the effect of the impairment is emphasized. Doing so, it allows the neural network to determine the location of various types of impairment with higher accuracy in contrast to the conventional solutions which are less precise or even incapable to determine the impairment location.

According to an example embodiment, the means are further configured to perform deriving a far-end crosstalk based on the measured noise power spectral density, and wherein the means are further configured to perform the determining in case the far-end crosstalk is equal or above a predetermined value.

The far-end crosstalk, FEXT, represents the coupling between a line and its neighboring lines. When there is no signal transmitted on the line, the FEXT reflects the amount of power emitted by the neighboring lines and captured by the line. This captured external power amplifies the effects of impairment patterns. Thus, the higher the FEXT, the stronger the impact of an impairment on the measured noise power spectral density of the line, and, hence, the better the predictions of the learning model. Exploiting this observation allows determining a value for FEXT which ensures that means determines the location of the impairment with high accuracy.

According to an example embodiment, the means are further configured to receive a transmit power and to perform the deriving of the first and the second theoretical noise representation by taking into account the transmit power.

In general, the strength of the far-end crosstalk increases proportionally with the transmit power, i.e., the stronger the transmit power, the stronger the far-end crosstalk, FEXT. Taking into account the transmit power thus allows precise estimation of the far-end crosstalk and, in turn, accurate derivation of the theoretical noise representations. In practice, the transmit power is defined per ports by the operator of the wired network and needs to comply with the regulations specified by the country legislator. Exploiting this information, allows to derive the transmit power even if not provided to the apparatus.

According to an example embodiment, the means are further configured to perform deriving a length of the line based on the measured channel frequency response, and are further configured to perform the deriving of the first and the second theoretical noise representation by taking into account the length.

In general, the strength of the far-end crosstalk increases proportionally with the length of the line, i.e., the longer the line, the stronger the far-end crosstalk, FEXT, from the neighbouring lines. Taking into account the length of the line thus allows precise estimation of the far-end crosstalk and, in turn, accurate derivation of the theoretical noise representations.

According to an example embodiment, the means are further configured to perform deriving an ideal channel frequency response for the line based on the measured channel frequency response, and, further configured to perform deriving of the second theoretical noise representation by taking into account the ideal channel frequency response, and further configured to perform deriving of the first theoretical noise representation by taking into account the measured channel frequency response.

In other words, the second theoretical noise representation expressing the noise power spectral density of the line without any impairment is derived based on the ideal channel frequency response which provides a medium characteristic of a non-impaired line, while the first theoretical noise representation expressing the noise power spectral density of the line with an impairment is derived based on the measured channel frequency response. In this way, theoretical noise representation provides accurate expression of the line with and without impairments.

According to an example embodiment, the measured channel frequency response comprises measured upstream and downstream channel frequency responses, and the measured noise power spectral density comprises a measured upstream and downstream noise power spectral density, and the means are further configured to perform deriving first upstream and downstream theoretical noise representation for the line with the impairment and a second upstream and downstream theoretical noise representation of the line without the impairment, and the means are further configured to perform determining the information indicative of an impairment of the line based on the measured upstream and downstream noise power spectral density, the first theoretical upstream and downstream noise representation, and the second theoretical upstream and downstream noise representation.

Obtaining measurements for the channel frequency response and the noise power spectral density for both the upstream and downstream directions allow to further improve the accuracy of the determination of the location of the impairment. This is because the location of the impairment may impact the channel frequency response and/or the noise power spectral density in a different way. For example, a "bridged tap" type of impairment affects similarly the channel frequency response for the line in the upstream and downstream directions but affects differently the noise power spectral density for the line in the upstream and downstream directions. Furthermore, the channel frequency response and/or the noise power spectral density in the upstream and downstream directions may be affected differently in case the impairment is punctual or distributed.

Thus, using both the information for the upstream and the downstream directions allows to further improve the accuracy with which the location of the impairment is determined.

According to example embodiments, the neural network is a convolutional neural network. In an example embodiment, the convolutional neural network comprises at least one convolutional layer and at least one fully connected layer wherein the at least one convolutional layer is configured to extract features based on the measured noise power spectral density, the first theoretical noise representation, and the second theoretical noise representation, and the at least one fully connected layer is configured to estimate the location of the impairment on the line based on the extracted features. Each convolutional layer may be followed by a batch normalization operation and/or dropout operations. Batch normalization is a technique that standardizes the inputs to the respective convolutional layers which in turn allows using higher learning rates resulting in accelerated training of the neural network, reduces overfitting, and relaxes the requirements to initialization of the neural network. Optionally, batch normalization may be performed at the input of the first convolutional layer in case the measured noise power spectral density, the first theoretical noise representation, and the second theoretical noise representation are not normalized. Dropout operations, on the other hand, is a regularization technique performed by randomly removing, or omitting, nodes from the respective layers during the training of the neural network which allows to reduce the overfitting of the neural network. Preferably, the neural network comprises two convolutional layers and two fully-connected layers. A neural network with such configuration performs optimally in capturing the similarities observed across the measured noise power spectral density and the theoretical noise representations.

According to an example embodiment, the means are further configured to perform determining a type of the impairment based on the measured channel frequency response and the means are further configured for deriving an error margin for the location based on the type of the impairment.

In other words, the means provide not only information indicative of the location of the impairment but also an indication of the type of the impairment. The type of impairment may indicate that the impairment is e.g., a single, multiple, or partial bridged taps, partial or complete capacitive coupling, a degraded contact, and so on. Further, the type of impairment may indicate whether the impairment is punctual or distributed. A punctual impairment is an impairment located at an exact location on the line, while a distributed impairment is an impairment that may be observed at multiple locations on the line. The means may further provide an error margin for the location of the impairment based on its type. The error margin is derived during the training of the neural network and reflects the error distribution per impairment type on the training set. More specifically, the error margins are statistically determined empirical values, based on predictions provided by the trained neural network, reflecting the spread, and to a certain extent the precision, of the predictions per impairment type based on the training set.

According to an example embodiment, the means are further configured to perform outputting the impairment type, the location of the impairment, and the error margin.

The information outputted by the means provides a full characterization of the impairment, i.e. its type, its location, and the corresponding error margin, which allows the technician not only to find the right location but also to assess how best to resolve the impairment, i.e., it provides insights to the technician on the most appropriate actions to take. This ultimately leads to improving the maintenance costs and intervention time.

According to an example embodiment, the wired network is a wired communication network. Wired communication networks may, for example, be established over telephone networks, cable television networks, fiber-optics communication networks, or even the power grid network. The lines in a wired communication network established over the telephone network are referred to as digital subscriber lines, DSLs.

According to an example embodiment, the line of the wired network comprises a DSL line, wherein said channel frequency response is a Hlog, and wherein said noise power spectral density is quiet line noise, QLN.

According to an example embodiment, the means are further configured to perform:
  obtaining a training set of measured noise power spectral density for lines of the wired network affected by at least one known impairment, a first training set of theoretical noise representations for the lines with the at least known impairment, and a second training set of theoretical noise representations for the lines without the at least one known impairment; and
  training a learning model implemented by the neural network for predicting, based on the training set of measured noise power spectral density, the first set of theoretical noise representation and the second set of theoretical noise representation, a location of the at least one known impairment on the line.

In other words, the neural network is trained based on training data set. The training data set comprises a training set of measured noise power spectral density for lines of the wired network affected by one or more known impairments, a training set of theoretical noise representation for the lines with the known impairments, and a training set of theoretical noise representation for the line without the known impairments. The two sets of theoretical noise representations are derived in the same manner as described above. Using the training data set the learning model of the neural network is trained to predict the location of one or more known impairments.

In other words, the neural network allows to optimally filter and extract patterns out of noise power spectral density and the theoretical noise representations and to learn how to combine them to derive the information indicative of the impairment location. Using a neural network thus allows to accurately determine the impairment location even if the measured noise power spectral density is noisy.

According to an example embodiment, the means are further configured to perform deriving of an error margin for the at least one known impairment from the predicted location of at least one known impairment and an expected location of the at least one known impairment.

In other words, error margins are derived for respective impairments. These error margins may be stored in the form of a look-up table in a memory for subsequent use by the means as detailed above in the preceding embodiments. The memory may, for example, be a local memory of the apparatus or a memory located on the cloud and accessible by the means.

According to an example embodiment, the means comprises at least one processor and at least one memory including computer program code, the at least one memory and computer program code configured to, with the at least one processor, cause the apparatus to perform:
  obtaining a measured channel frequency response, and a measured noise power spectral density for a line of a wired network susceptible to an impairment;
  deriving, in case of an indication of an impairment present on the line, from the measured channel frequency response and the measured noise power spectral density, a first theoretical noise representation for the line with the impairment and a second theoretical noise representation for the line without the impairment; and
  determining information indicative of a location of the impairment in the line, by processing the measured noise power spectral density, the first theoretical noise representation, and the second theoretical noise representation with a neural network According to a second example aspect, a method is disclosed as defined in claim 13. In particular, the method comprises:
  obtaining a measured channel frequency response and a measured noise power spectral density for a line of a wired network affected by an impairment;
  deriving, in case of an indication of an impairment present on the line, from the measured channel frequency response and the measured noise power spectral density, a first theoretical noise representation for the line with the impairment and a second theoretical noise representation for the line without the impairment; and
  determining information indicative of a location of the impairment in the line by processing the measured noise power spectral density, the first theoretical noise representation, and the second theoretical noise representation with a neural network.

According to a third example aspect, a computer program product is disclosed as defined in claim 14. In particular, the computer program product comprises computer-executable instructions for causing a computer to perform at least the following:
  obtaining a measured channel frequency response and a measured noise power spectral density for a line of a wired network affected by an impairment;
  deriving, in case of an indication of an impairment present on the line, from the measured channel frequency response and the measured noise power spectral density, a first theoretical noise representation for the line with the impairment and a second theoretical noise representation for the line without the observed impairment; and
  determining information indicative of a location of the impairment in the line by processing the measured noise power spectral density, the first theoretical noise representation, and the second theoretical noise representation with a neural network.

According to a fourth example aspect, a computer readable storage medium is disclosed as defined in claim 15. In particular, the computer readable storage medium comprises computer-executable instructions for performing at least the following steps when run on a computer:
  obtaining a measured channel frequency response and a measured noise power spectral density for a line of a wired network affected by an impairment;
  deriving, in case of an indication of an impairment present on the line, from the measured channel frequency response and the measured noise power spectral density, a first theoretical noise representation for the line with the observed impairment and a second theoretical noise representation for the line without the observed impairment; and determining information indicative of a location of the observed impairment in the line by processing the measured noise power spectral density, the first theoretical noise representation, and the second theoretical noise representation with a neural network.

The various example embodiments of the first example aspect may be applied as example embodiments to the second, third and fourth example aspects.

BRIEF DESCRIPTION OF THE DRAWINGS

Some example embodiments will now be described with reference to the accompanying drawings.

FIG. 4A shows example plots of a measured channel frequency response and a measured noise power spectral density for a line in a wired network;

FIG. 4B shows example plots of a calculated ideal channel frequency response based on the measured channel frequency response of FIG. 4A;

FIG. 4C shows example plots of the theoretical noise representations derived based on the measured channel frequency response and the measured noise power spectral density of FIG. 4A;

DETAILED DESCRIPTION OF EMBODIMENT(S)

Figure 1A:
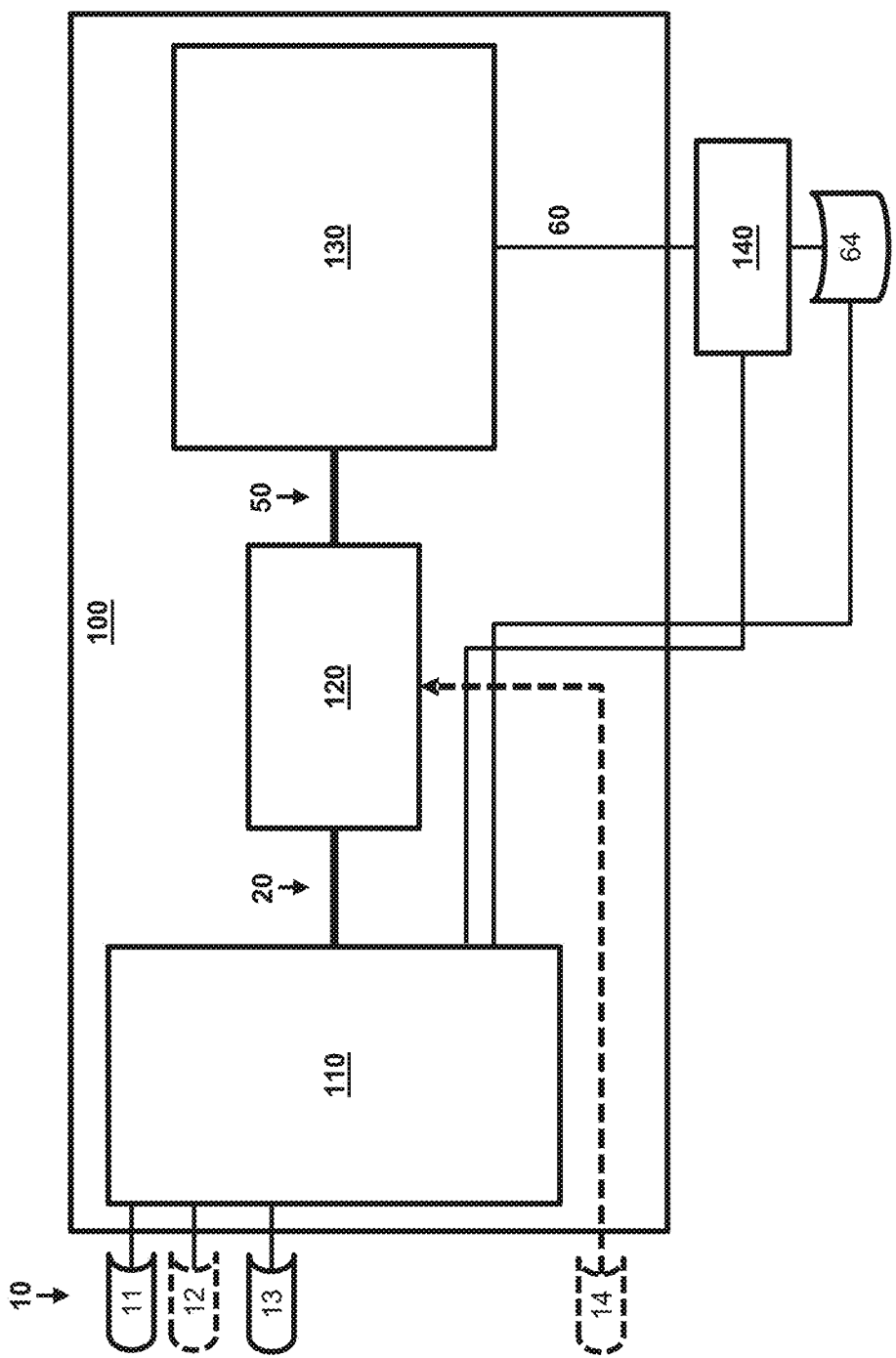
FIG. 1A shows a simplified block schematic of the apparatus according to an example embodiment of the present disclosure.

The present disclosure proposes a solution capable of characterizing an impairment on a line in a wired network in terms of its type and location based on the channel frequency response and the noise power spectral density measured by network devices in the wired network. The solution employs a neural network that exploits the relationship between the measured channel frequency response and the noise power spectral density for the line to quantify the location of the impairment.

The channel frequency response for a line is commonly expressed in dB and in the context of digital subscriber lines, DSLs, called Hlog. The channel frequency response is a measurement performed by a modem, e.g. the modem located at the client premises or the modem located at the central office. The channel frequency response reflects the attenuation of the medium, in this case, the cable, over the emitted signal as a function of the frequency.

The noise power spectral density on the other hand reflects the noise present on the line when no signal is transmitted on the line. In the context of DSL, the noise power spectral density is referred to as a quiet line noise, QLN and is expressed in dB over the frequency band. The QLN measured by the modem at the client premises reflects the QLN for the downstream bands and the QLN measured by the modem at the central office reflects the QLN for the upstream bands.

The Hlog curve is sensitive to the presence of any impairments or, in general, to the presence of any unexpected topological configuration on the line. For instance, in the presence of a "double path", commonly referred to as a "bridge tap", the Hlog curve presents some dips in its shape. The number of these dips, their shape, and their location depending on the characteristics of the bridge tap itself, such as the length of the bridge tap, the termination of the bridge tap which can be open or connected to a phone, and the type of cable of the bridge tap, for example, a gauge or an insulator, or more generally its impedance. In other words, in presence of impairments, the Hlog curve exhibits patterns showing the presence of a possible impairment on the line. However, the presence of one or more impairments may also impact the shape of the QLN curve. More interestingly, the presence of impairments impacts the QLN curves for the downstream and the upstream differently depending on its location. That is, the impairment will impact the upstream and the downstream QLN curves differently depending on whether the impairment is closer to one end of the line, and/or whether the impairment is punctual or distributed.

Thus, the strength or visibility of these patterns as observable from the noise power spectral density measurements depends on the impairment itself and its impact on the upstream and/or downstream direction. The strength or visibility of these patterns in the noise power spectral density further depends on the presence of far-end crosstalk which accentuates these patterns more than other noises such as background noise, radio frequency impulse noise, etc., captured in the noise power spectral density.

Embodiments of the present disclosure disclose an apparatus capable of determining information characterizing possible impairments present on one or more lines of a wired network in terms of their type and location based on information obtained by the network devices on the wired network and more specifically based on information obtained from the channel frequency response and the noise power spectral density measurements obtained from the network devices.

FIG. 1 shows a simplified block schematic of apparatus 100 according to an example embodiment of the present disclosure. Apparatus 100 comprises a pre-processing module 110, a preparation module 120, a neural network module 130, and an optional assembly module 140, which in FIG. 1A is shown to be outside apparatus 100. In embodiment, the apparatus 100 may further comprise at least one processor and at least one memory which is however not shown in this figure for simplicity reasons. Algorithms to operate the apparatus and its modules are provided as software or program instructions stored in the memory. In addition to storing software instructions, at least one memory may further store any data generated by the apparatus and its modules and any other data required for their proper operation. This data may, however, be stored in another memory external to the apparatus. At least one processor can execute the instructions stored in at least one memory and controls the operation of the apparatus as a whole, i.e., by controlling the operation of its modules. Otherwise said, in an embodiment the apparatus 100 comprises a computing system that comprises hardware and software components for processing the obtained information and for determining therefrom information characterizing possible impairments present on the lines of the wired network in terms of their type and location.

The apparatus 100 is configured to obtain measured noise power spectral density curves 11 and measured channel frequency response curves 13 for at least the upstream frequency bands, or for the downstream frequency bands, or both, on one or more lines of the wired network. The apparatus 100 is further configured to obtain if provided, information for the transmit power 12 for either of the upstream, downstream, or both frequency bands for the respective one or more lines of the wired network, and information indicating the length of the respective lines 14. In FIG. 1A inputs 12 and 14 are shown in dashed lines, to indicate they are optional input data. The apparatus 100 may obtain this information 10 from devices comprising specific equipment for measurements coupled to the respective lines which can be located at the end-user side and/or at the service provider side, for example. The obtained information 10 is then processed by the apparatus 100, and as detailed below information 60 indicative of a location of an impairment of the lines is determined and provided at an output of apparatus 100. As mentioned earlier in other embodiments of the apparatus the additional module 140 is also included in the apparatus which module 140 is further configured for characterizing the type of possible impairments present on one or more lines of the wired network in terms of their type and location and for providing all this information, i.e., location and type of impairments, at output 64.

Figure 1B:
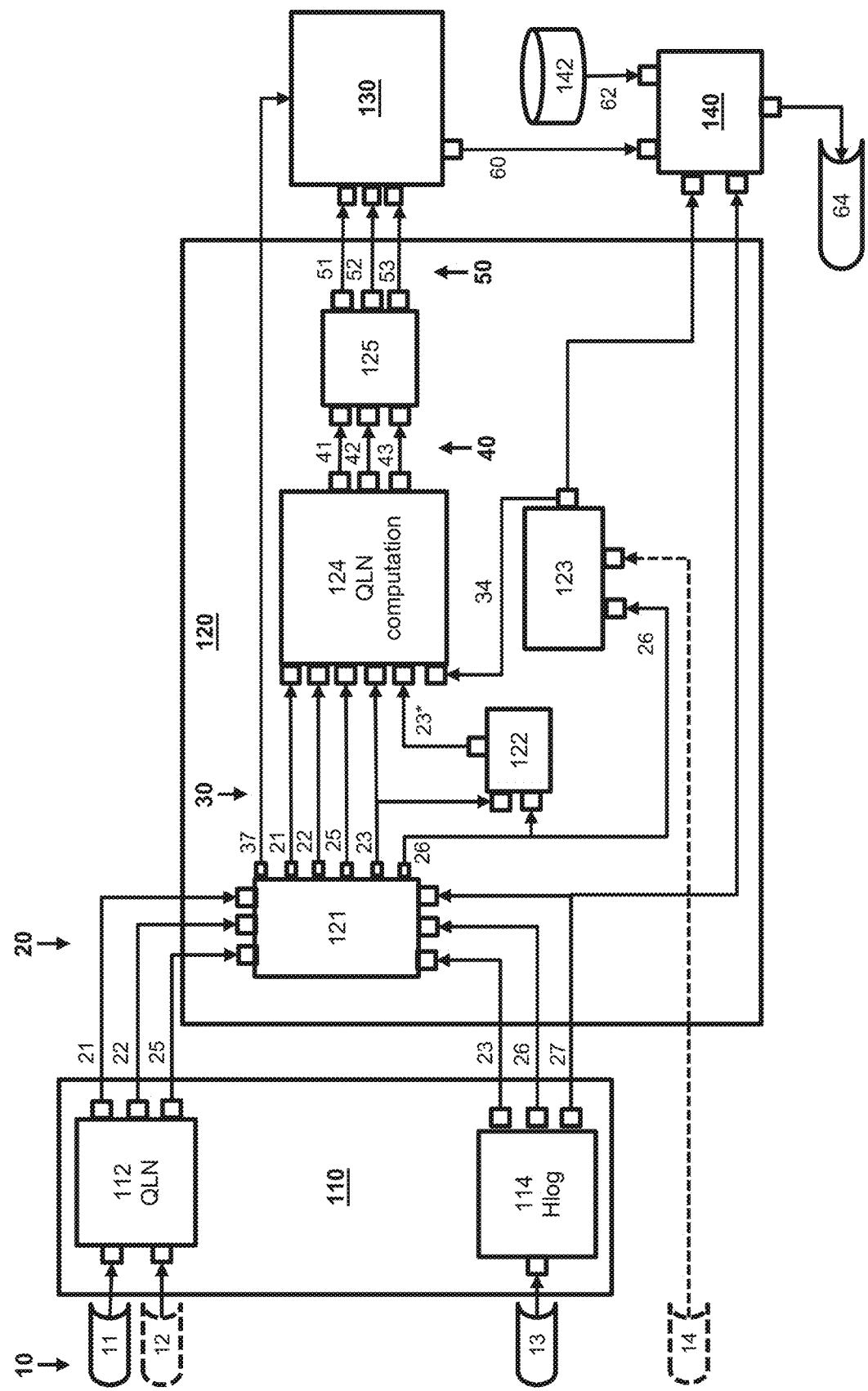
FIG. 1B shows a detailed block schematic of the apparatus according to an example embodiment of the present disclosure.
Figure 2:
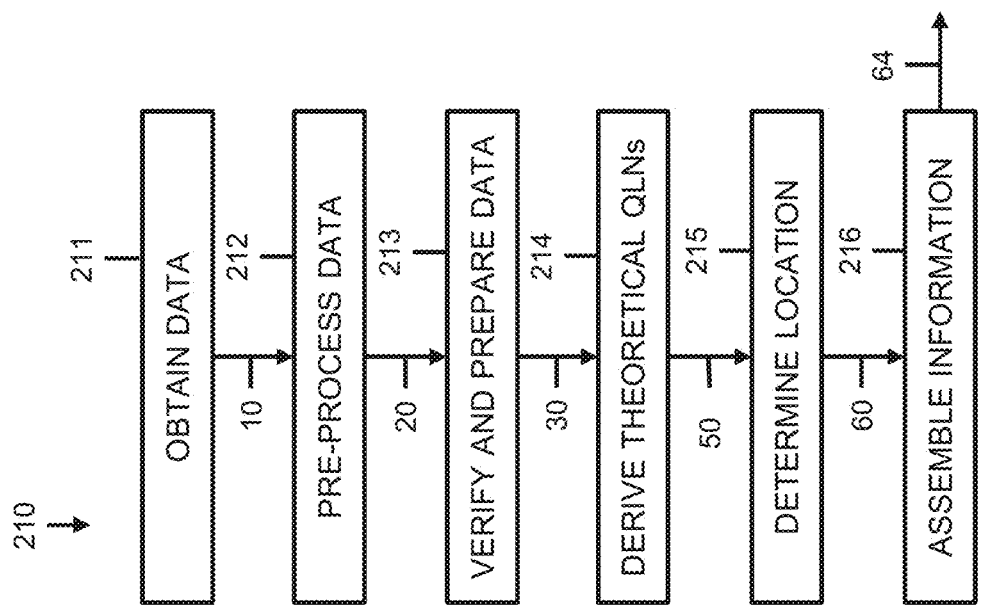
FIG. 2 shows steps for determining impairment information for a line of a wired network according to an example embodiment of the present disclosure.

The operation of the apparatus and its modules will be now described in detail with reference to FIG. 1B and FIG. 2 with FIG. 1B showing a more detailed block schematic of an embodiment of the apparatus 100, and FIG. 2 showing steps of an exemplary method for determining impairment information for a line of a wired network. Furthermore, the operation of the apparatus and its modules will be described below with reference to DSL technology according to which the noise power spectral density curves are referred to as quite low noise, QLN, curves, the channel frequency response curves are referred to as HLOG curves as they are expressed in a logarithmic format, the transmit power is referred to as TXPSD, and the length of the line as a loop length, LL. However, a person skilled in the art can readily apply these teachings to other wired networks where channel frequency response and noise power spectral density measurements can be obtained for its respective lines.

The pre-processing module 110 of the apparatus 100 is configured to obtain 211 the measured noise power spectral density curves 11, the measured channel frequency response curves 13, and optionally, as depicted by the dashed lines, the transmit power information 12 for respective lines of the wired network. As detailed above, the functionality of the pre-processing module 110 may be realized as a combination of hardware and software implementation. The pre-processing module 110, as its name signifies, is configured to pre-process 212 the obtained information 11, 12, and 13 to a format required by the verification and preparation module 120 and to extract, therefrom, any additional information required by the preparation module 120. The pre-processing module 110 is further configured to obtain from the obtained information 11, 12, and 13, information indicative of impairment present on the respective lines in terms of its type and relevance.

Figure 3B:
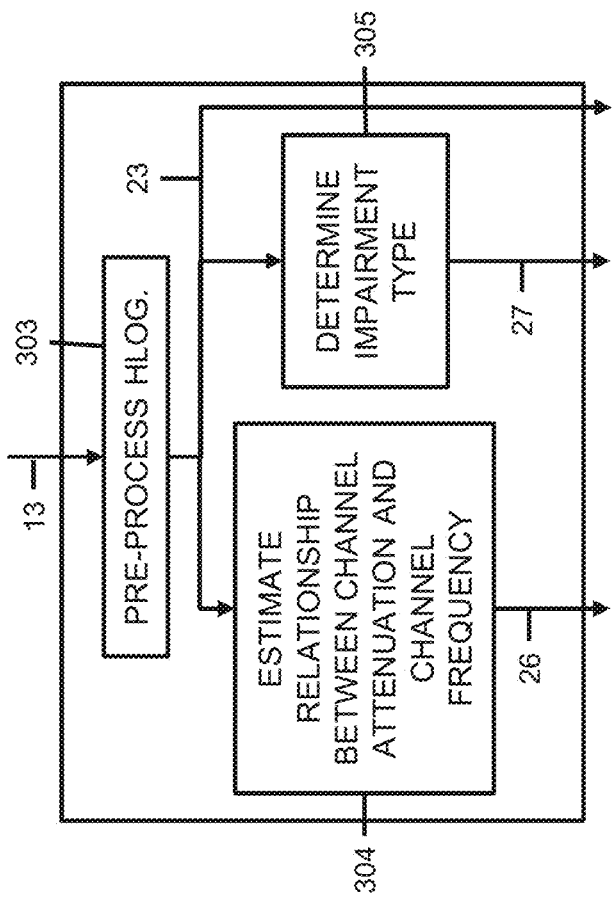
FIG. 3B shows steps for pre-processing a measured channel frequency response according to an example embodiment of the present disclosure.
Figure 3A:
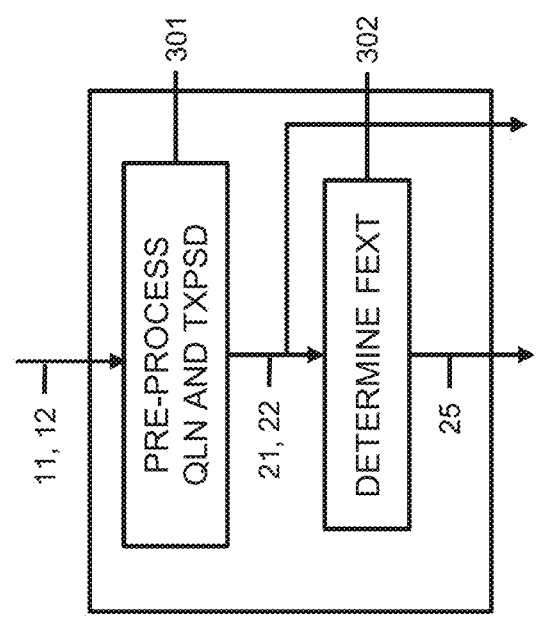
FIG. 3A shows steps for pre-processing a measured noise power spectral density according to an example embodiment of the present disclosure.

More specifically, in the embodiment shown in FIG. 1B, the pre-processing module 110 comprises a QLN sub-module 112 and an HLOG sub-module 114. The operation of the QLN and HLOG sub-modules will now be described with reference to FIG. 3A and FIG. 3B, with FIG. 3A showing the operational steps performed by the QLN sub-module, and FIG. 3B showing the operational steps performed by the HLOG sub-module.

The QLN sub-module 112 is configured to obtain the measured noise power spectral density curves, i.e., the so-called quiet line noise, QLN, curves 11 for at least the upstream direction, i.e., $QLN_{US}$, or for at least the downstream direction, i.e., $QLN_{DS}$, or both, and, optionally, to obtain information for the transmit power again for either of the upstream direction, i.e. $TXPSD_{US}$, or the downstream direction, i.e., $TXPSD_{DS}$, or both. To do so, the QLN sub-module 112 first pre-processes in step 301 the measured QLN curves 11 to obtain a clean and complete measured QLN curve 21. Thus, after the pre-processing 301, the QLN sub-module obtains pre-processed QLN curve for at least the upstream or at least the downstream, or both bands. In case the QLN sub-module 112 also obtains TXPSD curves 12, the TXPSD curves 12 are also pre-processed to obtain clean and complete TXPSD curves 22. The pre-processing 301 applies cleaning and correction operations such as gap filling, padding, interpolation, noise compensation, and so on, to the respectively obtained curves. In case TXPSD curves 12 are not provided to the QLN sub-module 112, theoretical curves are derived instead. The theoretical TXPSD curves can be derived from the communication standard, e.g., from the VDSL2 ITU-T standard, which defines the maximum transmit power for the network devices. Alternatively, the theoretical TXPSD curves can be derived based on the transmit power defined by the operator of the wired network, or by the transmission regulations specified by the country legislator. The pre-processed QLN curves 21 and the pre-processed or theoretical TXPSD curves 22 are then used to determine in step 302 the far-end crosstalk 25, FEXT, on the line. The FEXT 25 may e.g., be determined by means of conventional techniques or alternatively using a neural network comprising at least one convolutional layer made of convolution and pooling steps, and a fully connected layer as described in detail in the not yet published European Patent application with application Number 20169194.6, filed by the Applicants on Apr. 10, 2020 and which is herewith incorporated by reference. The determined FEXT 25 represents the aggregated level of far-end crosstalk on at least the upstream, downstream, or both the upstream and downstream bands, i.e. $FEXT_{US}$ and $FEXT_{DS}$.

The QLN sub-module 112 thus outputs the pre-processed QLN 21, the pre-processed or theoretical TXPSD 22, and the determined FEXT 25.

The HLOG sub-module 114 is configured to obtain the measured HLOG curves 13 for at least the upstream bands, i.e., $HLOG_{US}$, or at least the downstream bands, i.e., $HLOG_{DS}$, or both the upstream and downstream bands, and, to derive, therefrom, the type of impairment 27 and parameters allowing to determine original or ideal HLOG curves corresponding to the HLOG curves for the corresponding line but without the presence of any impairments. To do so, the HLOG sub-module pre-processes in step 303 the measured HLOG curves to obtain a clean and complete version of the respective measured HLOG curves. The pre-processing 303 thus applies cleaning and correction operations such as gap filling, padding, interpolation, noise compensation, and so on. The pre-processed HLOG curves are then used to estimate in step 304 the relationship between the channel attenuation and the channel frequency, and to determine in step 305 the type of impairment. The estimation 304 and the determining 305 may be done in any order or parallel.

The estimation step 304 aims at estimating the relationship between channel attenuation and the channel frequency allows to determine the original or ideal HLOG curves corresponding to the HLOG curves for the line without the presence of any impairments, i.e., $HLOG_{orig}$. To determine $HLOG_{orig}$ curves, the HLOG sub-module estimates the so-called OH slope and intercept parameters 26 from the respective pre-processed HLOG curves 23. The OH slope and intercept parameters 26 may be obtained using any conventional techniques capable of deriving these parameters from the measured HLOG curve, or alternatively also using a neural network comprising at least one convolutional layer made of convolution and pooling processing steps and a fully connected layer. Thus, a pair of OH slope and intercept parameters are estimated for each HLOG curve. These parameters then allow representing the respective measured HLOG curves 13 using the theoretical model, $HLOG_{orig} = A * freq^2 + B$, with A being the OH slope and B being the intercept ranging over the frequency spectral for the addressed technology. The estimation of the OH slope and intercept parameters 26 may be performed by means of a neural network.

The determining step 305, as mentioned above, identifies if there is an impairment present on the line and its type 27. To do so, the HLOG sub-module processes the pre-processed HLOG curves by means of a neural network as e.g., described in EP 3691186 A1 and EP 3528432 A1 which predicts whether a possible impairment is present on the line as well as its type. For example, the neural network may predict that there is an impairment of the following types:
  'non_impaired_line', abbreviated herein as 'NIL'
  'bridged_tap', abbreviated herein as 'BTap'
  'multiple_bridged_taps', abbreviated herein as 'BTap2'
  'partial_bridged_tap', abbreviated herein as 'pBTap'
  'pots_isdn_bridged_tap', abbreviated herein as 'BTapT'
  'partial_capacitive_coupling', abbreviated herein as 'pCC'
  'partial_degraded_contact', abbreviated herein as 'pDC'
  'partial_insulation_fault', abbreviated herein as 'pIF'
  'capacitive_coupling', abbreviated herein as 'CC'
  'degraded_contact', abbreviated herein as 'DC'
  'insulation_fault', abbreviated herein as 'IF'
  'loading_coil', abbreviated herein as 'LC'
  'misconnected_splitter', abbreviated herein as 'McS'
  'impedance_mismatch', abbreviated herein as 'MMS'
  'missing_splitter', abbreviated herein as 'MsS'
  'unbalance_line', abbreviated herein as 'UL'
  'too_long_line', abbreviated herein as 'TLL' with a confidence level ranging from 0 to 1. Additionally, the impairment type may be further characterized as 'punctual or 'distributed'. A punctual impairment is, for example, a bridged-Tap, BTap, that is located at the exact location where a second line is connected to the principle one. A distributed impairment is, for example, a mismatched segment, i.e., a segment part of the line that has been replaced with a new cable with a slightly different physical characteristics compared to the original one. These mismatched segments may have different lengths and can be located anywhere on the line.

The HLOG sub-module 114 thus outputs the pre-processed HLOG curves 23, the OH slope and intercept of the measured HLOG 26, and the impairment type 27.

Referring to both FIG. 1B and FIG. 2, the information 20 outputted by the combined pre-processing steps 212, i.e., by QLN sub-module 112 and the HLOG sub-module 114 of FIG. 1B, is then fed to the preparation module 120 of FIG. 1B, which functional steps are denoted by the "verify and prepare data" step 213 in FIG. 2. Similar to the pre-processing module 110, the functionality of the preparation module 120 may be realized as a combination of a hardware and software implementation. The preparation module 120 obtains from the pre-processing module 110 the pre-processed measured noise power spectral density curves 21, channel frequency response curves 23, and transmit power information 22, the estimated far-end crosstalk 25 for the respective lines, the OH slope and intercept parameters 26 for the respective HLOG curves, and the type of the identified impairments 27. The functional step performed by preparation module 120 then comprises verifying and preparing data in 213 of FIG. 2, of which the verifying sub-step involves checking whether the obtained information satisfies a set of predetermined requirements and, if so, a next sub-step of preparation of the obtained data 20 for the neural network module 130 is carried out.

Next in step 214 of FIG. 2, two theoretical noise representations that model the noise power spectral density of the respective lines for the case with an impairment and without impairment are calculated or derived from output 30 of step 213. These theoretical noise representations are computed by the QLN computation sub-module 124 of the preparation module 120 of FIG. 1B while the pre-processed QLN curve 21 is simply provided at its output as QLN curve 41. These theoretical noise representations are then further used as a calibration or reference input by the neural network module 130 of FIG. 1B to first identify the patterns caused by the impairment in the measured QLN curves 41 with a higher precision which then also allows the neural network module 130 to identify the location of the impairment on the respective line with much higher accuracy.

Importantly, these two theoretical noise representations are derived from the pre-processed, measured HLOG curves 23, the obtained pre-processed, measured TXPSD or optionally computed theoretical TXPSD information 22, and the FEXT 25. That is, the theoretical noise representations are not derived using any information from HLOG curves 13 or 23.

The theoretical noise representation modeling the noise power spectral density of the line with the observed impairment is calculated as the noise power spectral density at equal cabling and with an optimized number of disturbers or interfering neighboring lines. This theoretical noise representation is referred to as qln_th_ec_best_ndist and provides a reference of what the noise power spectral density curve should be with the pre-processed measured TXPSD 22 or the computed TXPSD 22 and the impairment observed in measured HLOG curve 13, 23 being fully transferred to the noise power spectral density. The other theoretical noise representation modeling the noise power spectral density of the line without the observed impairment, i.e., at repaired cabling like if the impairment would have been removed, is calculated the same way as the noise power spectral density again at equal cabling, i.e., also with an optimized number of disturbers. This theoretical noise representation is referred to as qln_th_rc_best_ndist and provides a reference of what the noise power spectral density curve should be with the measured TXPSD 22 and the impairment observed in the measured HLOG curve 13, 23 not transferred at all in the noise power spectral density. In both cases, the determined FEXT 25 is considered as the main source of the noise.

The determination of the theoretical qln_th_ec_best_ndist requires the measured or actual HLOG 23, i.e., $HLOG_{actual}$, while the determination of the theoretical qln_th_rc_best_ndist requires a new channel frequency response curve that corresponds to the original or ideal HLOG, i.e., $HLOG_{orig}$, 23*. The $HLOG_{orig}$ 23* are derived by the sub-module 122 of the preparation module 120. The sub-module 122 uses the OH slope and intercept parameters 26 and the pre-processed, measured HLOG curves 23 for the respective lines outputted by the pre-processing module 110 to calculate respective ideal HLOG curves 23* using the method described in EP 3691186 A1. Further, the determination of both theoretical noise representations by sub-module 124 uses the length of the respective lines to obtain more precise noise representations.

From there, the two theoretical noise representation can be derived empirically as follows:

$qln\_th\_ec\_best\_ndist = TX\_psd + FEXT\_loss\_ec$, with $FEXT\_loss\_ec = 10 \log_{10}(7.74e^{-21} * ndistE0.6 * loop_{length} * freq^2) + h \log\_actual$, and $qln\_th\_rc\_best\_ndist = TX\_psd + FEXT\_loss\_rc$, with $FEXT\_loss\_rc = 10 \log_{10}(7.74e^{-21} * ndistE0.6 * loop\_length * freq^2) + h \log\_ideal$, wherein ndist is a parameter that represents the number of disturbers or neighboring lines that is theoretically optimized to minimize the distance between the measured QLN curves 21 and the theoretical noise representations 42 and 43 separately.

Figure 3C:
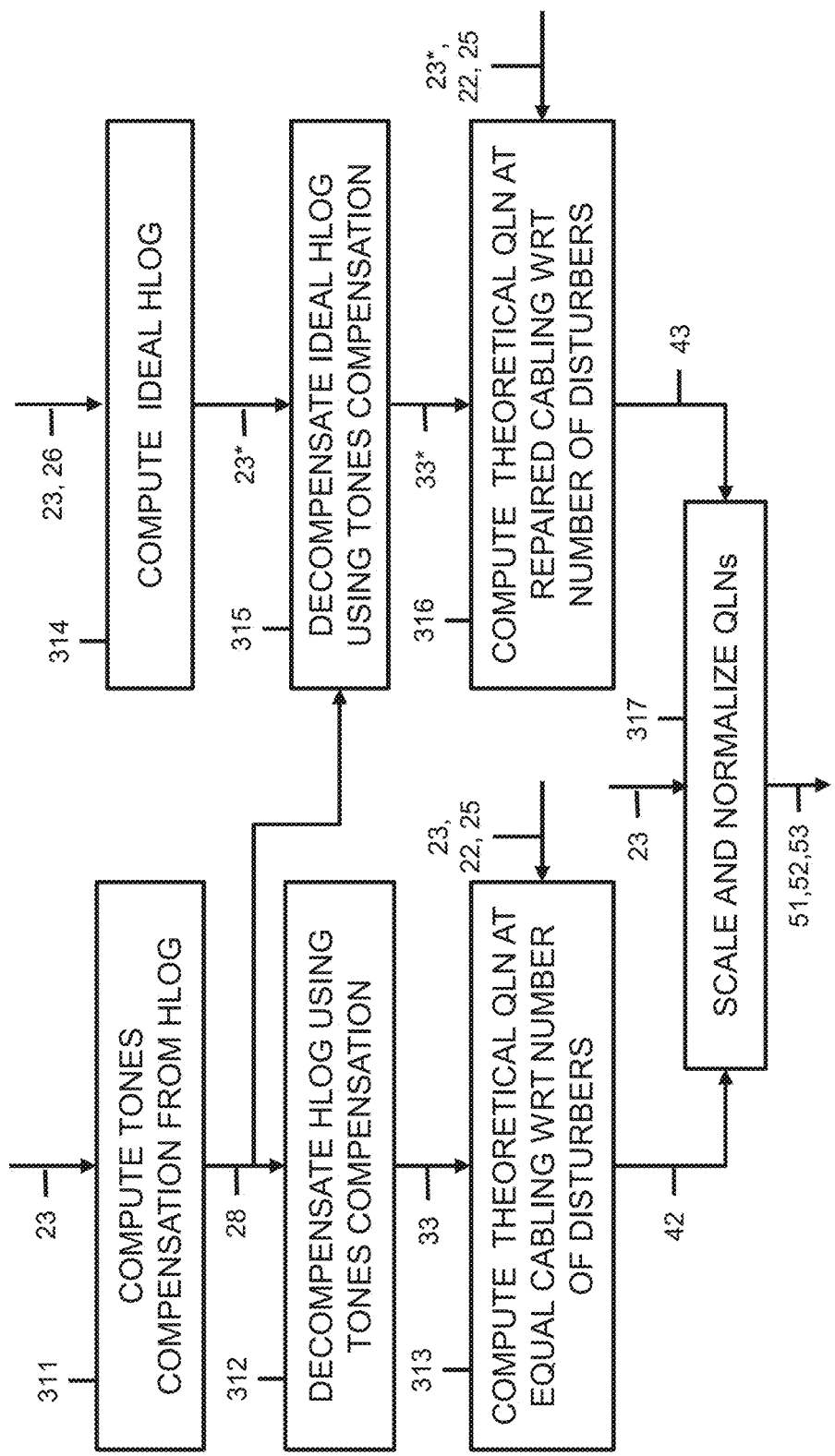
FIG. 3C shows steps for computing theoretical noise representations according to an example embodiment of the present disclosure.

FIG. 3C shows the steps performed by the sub-module 124 to derive the two theoretical noise representations. As shown in the figure, the tone compensations 28 from the respective pre-processed HLOG curves 23 are computed in step 311. The tone compensation can be done by any suitable for the purpose techniques. The tone compensations 28 are then used to decompensate in step 312 the respective pre-processed HLOG curves 23, thus obtaining decompensated HLOG curves 33 for the respective lines. The tone compensations 28 are also used to decompensate 315 the ideal HLOG curves 23* to obtain decompensated ideal HLOG curve 33*. Next, the first theoretical noise representation qln_th_ec_best_ndist 42 is calculated in step 313 at equal cabling using the decompensate HLOG curves 33, the pre-processed HLOG curves 23, the pre-processed TXPSD 22, and the derived FEXT 25, and the second theoretical noise representation qln_th_rc_best_ndist 43 is calculated in step 316 at equal cabling using the decompensated ideal HLOG curves 33*, the ideal HLOG curves 23*, the pre-processed TXPSD 22, and the derived FEXT 25. Both of these theoretical noise representations are computed for the optimum number of disturbers that minimizes the distance between the measured QLN curves 21 and the theoretical noise representations.

Figure 3D:
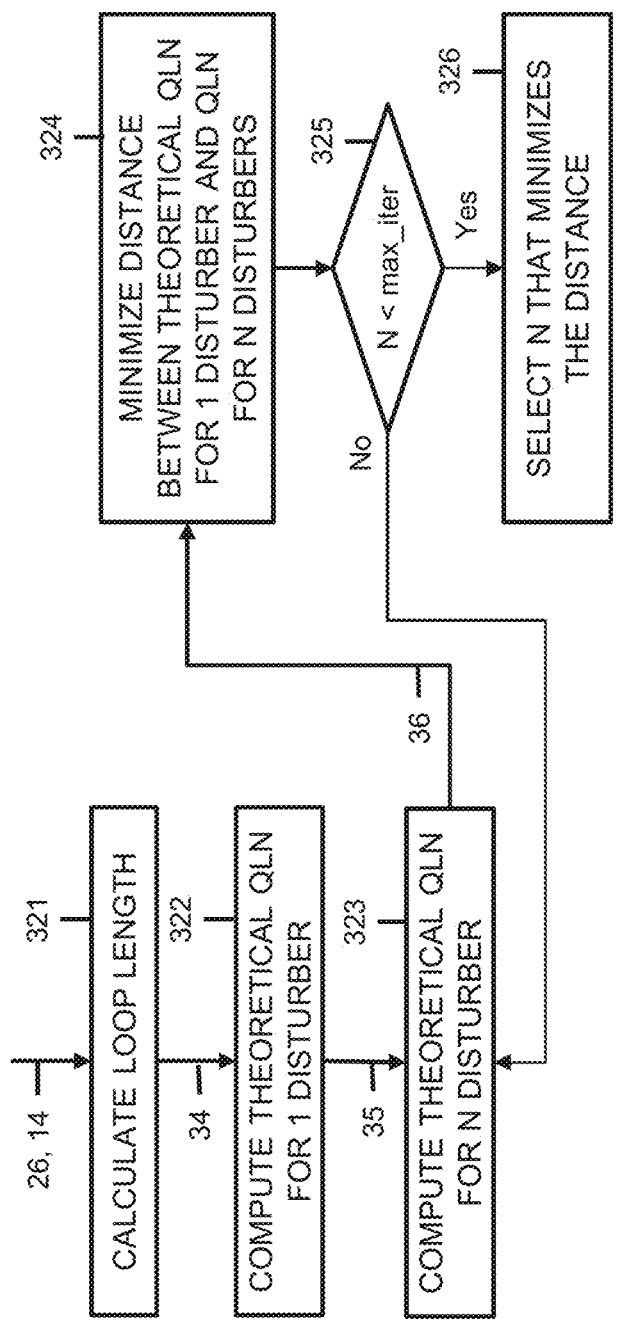
FIG. 3D shows further steps for computing the theoretical noise representations according to an embodiment of the present disclosure.

To do so, the computation of the theoretical noise representation is done as further detailed in FIG. 3D. First, the loop length or the length of the respective lines is calculated in step 321. As mentioned above, if the loop length 14 for the respective lines is directly provided at input 14 of the apparatus 100, step 321 is omitted. If the loop length 14 is not provided, then the loop length for the respective lines is calculated based on the OH slope parameter by exploiting the theoretical observation that there is a straight-forward mapping between the OH slope, A, and the length of the line, within some precision boundaries which depend on the cable types and properties. Using this observation and the cable types and properties, it is possible to derive a look-up table as below that can be used to estimate the loop length 34 for the respective lines based on the value of the corresponding OH slope parameter.

| OH slope | Median Loop length (any cables) | Error on loop length |
| --- | --- | --- |
| 0 | 0 [m] | 10 [m] |
| −0.5 | 150 [m] | 15 [m] |
| −1.0 | 290 [m] | 20 [m] |
| −1.5 | 420 [m] | 25 [m] |
| −2.0 | 550 [m] | 30 [m] |
| −2.5 | 700 [m] | 35 [m] |
| −3.0 | 820 [m] | 40 [m] |

Next, referring to FIG. 3B, the calculated loop length 34 is used to compute 322 the theoretical noise representation for a single disturber 35 which is then used to compute 323 the theoretical noise representation for N disturbers. Then the distance ndist between the theoretical noise representation for single disturber 35, i.e. qln_th_at_1_dist, and the theoretical noise representation for N disturbers 36 after deducting the FEXT 25, i.e., qln_th_at_N_dist−Fext, is minimized in step 324, i.e., ndist=argmin (qln_th_at_1_dist−qln_th_at_N_dist−Fext). The minimization step 324 can be performed by any suitable for the purpose minimization technique such as Brent's algorithm. The minimization is done iteratively until the local minimum, i.e., until the number of disturbers minimizing the distance, is found 326. Once, the local minimum is found or the maximum number of allowed iterations is exceeded 325, the sub-module 124 selects 326 the optimum number of disturbers, N, minimizing the distance.

Once the obtained theoretical noise representations 42 and 43 are computed, the theoretical noise representations 42 and 43 and the pre-processed QLN curves 23 are scaled and normalized in step 317 prior to being fed to the neural network module 130. The scaling and normalization are performed by sub-module 125 of the preparation module 120 of FIG. 1B. The scaling and normalization are as such optional but preferred as it improves the operation of the neural network module 130. The normalization may be performed by any conventional MinMax algorithm.

An example of a measured QLN curve and a measured HLOG curve for the upstream bands of a DSL line affected by an impairment are shown in FIG. 4A. As it can be seen in the figure, the QLN curve 402 exhibits similar patterns, i.e., dips, at the same locations as the dips observed in the channel frequency response curve 401 caused by a "bridge tap" impairment. The ideal HLOG 413 derived by the sub-module 122 is shown in FIG. 4B, and the pre-processed, measured QLN curve 431 provided by the QLN sub-module 112 and the two theoretical QLN curves derived by the sub-module 124, i.e., qln_th_ec_best_ndist curve 432 and qln_th_rc_best_ndist curve 433, are shown in FIG. 4C. As it can be seen, the theoretical curves reflect the pre-processed, measured QLN curve 431 much closer than the HLOG curve 401.

Referring back to FIG. 1B, the thus obtained scaled and normalized versions of the pre-processed QLN curves 51, and the scaled and normalized versions of the two theoretical QLN curves 52 and 53 are then fed to the neural network module 130. In FIG. 2, the functional step performed by this neural network is the determination 215 of the location of the impairment. The neural network module 130 implements a supervised regression to model the relationship among the provided QLN curves 51 to 53. In other words, the learning model implemented by the neural network module 130 exploits the features observed in the provided QLN curves to determine the location of the impairment present on the line.

The learning model can be trained by means of a learning system implementing, for example, a convolutional neural network, CNN, comprising at least one convolutional layer and at least one fully connected layer. The learning system however may implement other types of neural networks, such as a deep neural network, DNN, or a recurrent neural network, RNN. Once trained, the learning model can perform the determining 215 of the impairment location by exploiting the similarities observed in the provided QLN curves.

Figure 5A:
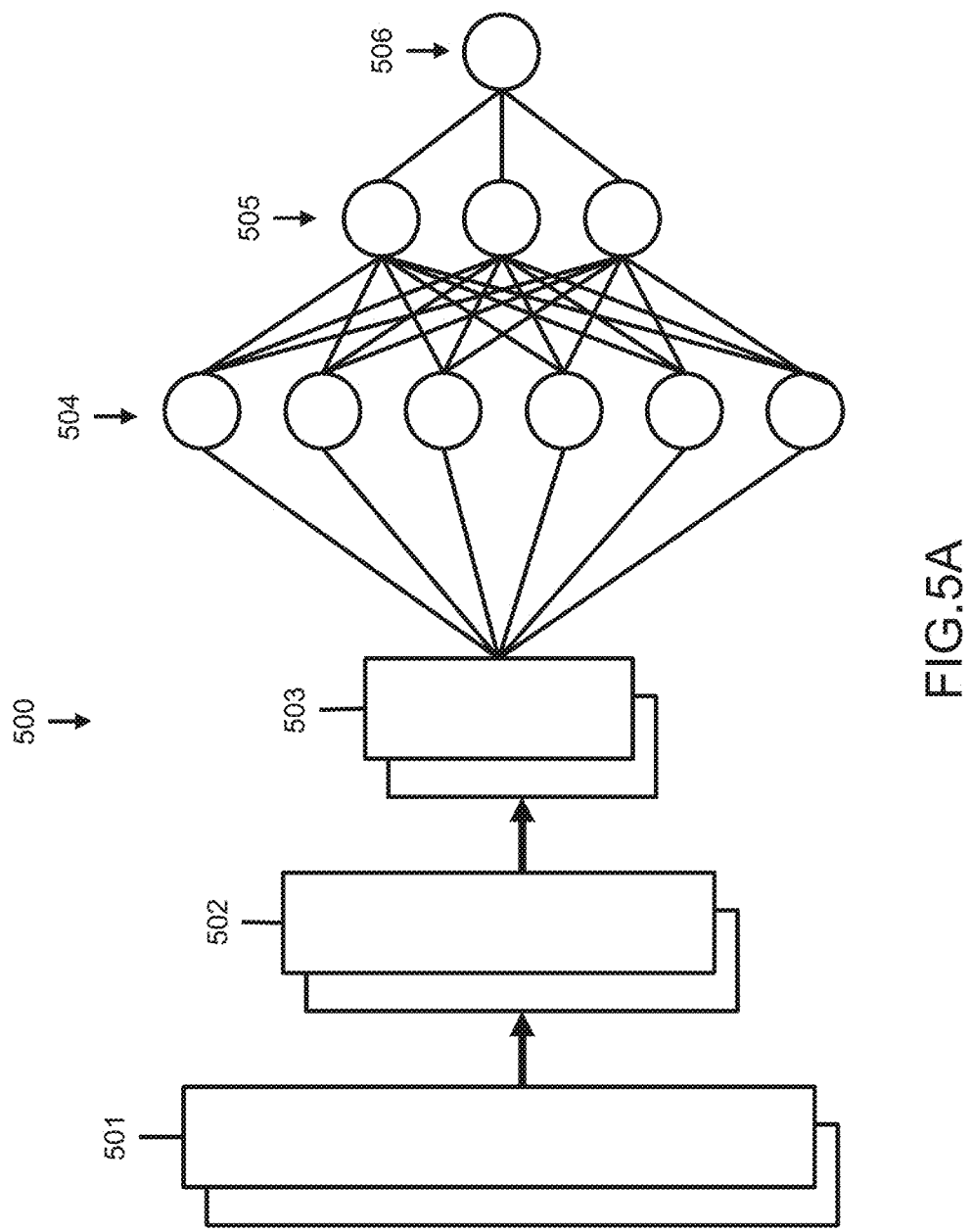
FIG. 5A shows a block schematic of a convolutional neural network according to an example embodiment of the present disclosure.
Figure 5C:
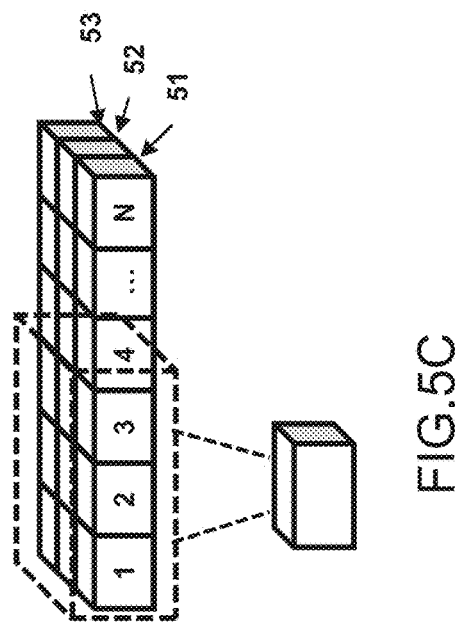
FIG. 5C shows a stack representation of the measured noise power spectral density and the theoretical noise representations according to an example embodiment of the present disclosure.
Figure 5B:
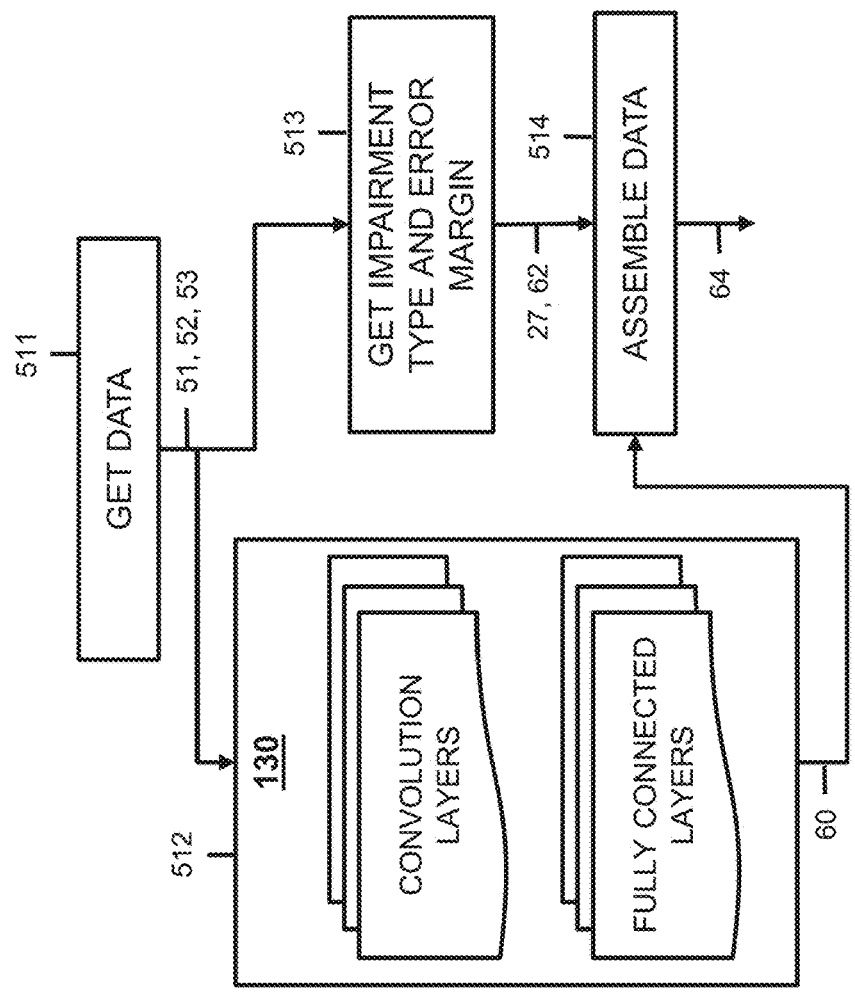
FIG. 5B shows steps performed by the convolutional neural network of FIG. 5A for determining impairment information according to an example embodiment of the present disclosure.

The neural network architecture and operation will be described below with reference to FIG. 5A, FIG. 5B, and FIG. 5C, with FIG. 5A showing a suitable neural network architecture, FIG. 5B showing the steps performed to derive information identifying the location of the impairment, and FIG. 5C showing details on how the QLN curves at the input of the neural network are considered.

FIG. 5A shows an example of a suitable CNN comprising three convolutional, CL, layers 501 to 503 and three fully connected, FC, layers 504 to 506, and a control logic (not shown in the figure) that encourages the extraction of the similarities across the QLN curves 51 to 53, i.e., the so-called features, to determine the impairment location. Preferably, each of the convolutional layers is followed by a pooling layer. The pooling layer consists of a downsampling operation to reduce the redundancy in the information between neighboring outputs resulting from the convolution operation. This allows to reduce the complexity of the learning model, and, in turn, the complexity of the neural network module. The FC layers, in turn, perform the regression task aimed at estimating the impact or the severity of the impairment on the upstream and/or downstream based on the features extracted by the CL layers. The fully connected layers are commonly referred to as dense layers. A densely connected layer provides or derives features from all combinations of the features derived or learned from the previous layer, whereas a convolutional layer relies on the consistency of the features with a small repetitive field. In other words, the FC layers aim at creating a latent space of lower dimensions that maps the extracted features identified by the convolutional layers onto severities.

In the first step shown in FIG. 5B, the neural network is provided 511 with the QLN curves. To ensure the extraction of the similarities or the common patterns observed in the provided QLN curves 51 to 53, the QLN curves are processed in step 512 by the neural network as a stacked input as shown in FIG. 5C and not as separate inputs. This allows the convolutional layer to process the obtained QLN curves jointly to extract the common patterns, such as the dips in the QLN curves shown in FIG. 4C. The output 60 of the neural network thus comprises a prediction of the severity of the impairment, i.e., a severity value, which reflects the severity of the impairment patterns captured in the far-end noise. The severity value reflects how well the impairment observed in the QLN curves in the downstream and/or the upstream, respectively. A severity value may thus be provided for either of or for both the upstream and downstream depending on what QLN curves have been provided to the neural network module 130. The severity values may, for example, be on a scale from 0 to 1, with 0 indicating a weak transfer and 1 indicating a strong transfer. Depending on whether QLN curves for upstream and/or downstream direction were provided to the neural network module 130, the neural network module 130 will output a severity score for either of the upstream and downstream direction, or both directions.

The severity score 60 outputted by the neural network module 130 is then fed to the assembly module 140 of FIG. 1B. Apart from the output provided by the neural network module, the assembly module 140 additionally obtains as shown in step 513 information about the impairment type 27 as well as the dispersion 62 associated to the impairment type. As shown in FIG. 1B, the impairment type 27 may be obtained directly from the pre-processing module 110 and its associated error margin from the local memory 142 of the apparatus 100.

The dispersion 62 for the particular impairment type quantifies the impact of the impairment over the length of the line. The dispersion for a respective impairment type is determined empirically based on the predictions obtained from the trained neural network, i.e., on the whole training data set and after completion of the training of the neural network.

The assembly module 140 then assembles in step 514 this information all together to output a complete characterization of the identified impairment, i.e., the impairment location, the error margin associated with the impairment location, and type of the impairment. This step corresponds to step 216 of FIG. 2.

The output 64 of the assembly module 140 may, for example, be expressed as severity$_{DS}$=0.91±0.161, severity$_{US}$=0.35±0.194 indicating severity of 0.91 and dispersion of 0.161 in the downstream and severity of 0.35 and dispersion of 0.194. In other words, the output of the assembly module 140 indicates an impairment strongly affecting the downstream and weakly affecting the upstream, which means that the impairment on the line is located close to the client premises equipment.

Optionally, the assembly module 140 may determine a relative impairment location and associated error margin from the severity and dispersion values. For example, if the assembly module 140 obtains a severity score from the neural network module 130 for the downstream directions only, the relative location can be determined by constructed a Gaussian distribution for that single pair of severity and the empirical dispersion values with a mean and standard deviation associated with the provided severity and dispersion, over a domain space ranging between 0 and 1, i.e.:

$$\mathcal{N}_{DS}=\mathcal{N}(x,\text{severity}_{DS},\text{dispersion}_{DS}), \text{with } x\in[0,1].$$

The obtained Gaussian distribution is then normalized to fit between 0 and 1 and the relative location and error margin are derived, therefrom, as follows:

$$L_{rel}=\text{severity}_{ds}* \mathcal{N}_{DS}$$

$$E_{rel}=\text{dispersion}_{DS}.$$

In case the assembly module 140 obtains severity scores for both upstream and downstream from the neural network module 130, the relative location of the impairment is derived by combining the severity scores for upstream and downstream while taking into account the empirical dispersion. To do so, two Gaussian distributions are created from the respective pairs of severity and the empirical dispersion values with their mean and standard deviation associated to the provided severities and dispersions, over a domain space ranging between 0 and 1, i.e.:

$$\mathcal{N}_{DS}=\mathcal{N}(x,\text{severity}_{DS},\text{dispersion}_{DS}), \text{with } x \in [0,1],$$

and $$\mathcal{N}_{US}=\mathcal{N}(x,1-\text{severity}_{US},\text{dispersion}_{US}), \text{with } x \in [0,1].$$

The obtained Gaussian distributions are then normalized to fit between 0 and 1 and then summed together. From the weighted sum of the two distributions, a relative impairment location corresponding to the maximum value of the resulting weighted sum and a relative error margin or interval are derived as follows:

$$L_{rel}=\text{argmax}(\text{severity}_{ds}* \mathcal{N}_{DS}+\text{severity}_{us}* \mathcal{N}_{US})$$

$$E_{rel}=(\text{dispersion}_{US}+\text{dispersion}_{DS})/2.$$

Optionally, this assembled information 64 may be provided in absolute values so that an absolute impairment location and absolute error intervals, for instance, both in [m] are provided. To do so, the assembly module 140 is configured to further obtain the loop length 34 derived by the sub-module 123. The obtained loop length is used to convert the relative location of the impairment $L_{rel}$ into an absolute location as follows: $L_{abs}$, [m]=$L_{rel}$*LL, [m], and the relative error margin into an absolute error margin as follows: $E_{abs}$[m]=$E_{rel}$*LL, [m]. This allows to apparatus to output a report 64 comprising the type of the identified impairment type 27, 37, its location, $L_{rel}$ or $L_{abs}$, and location error margin, $E_{rel}$ or $E_{abs}$.

Figure 5D:
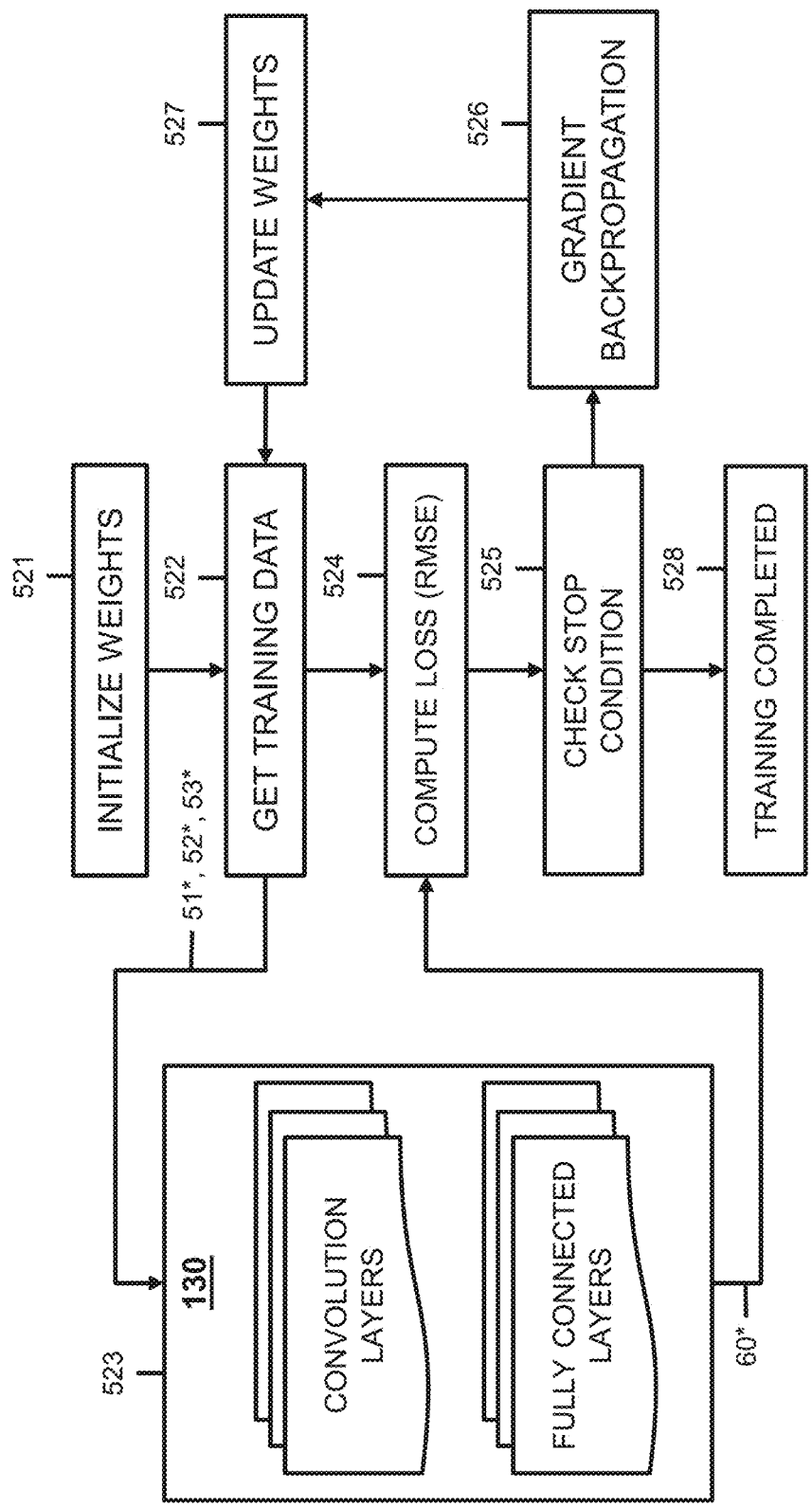
FIG. 5D shows steps for training the convolutional neural network for determining impairment information according to an example embodiment of the present disclosure.

The training of the learning model implemented by the neural network is performed using a training data set which comprises sets of pre-processed, measured QLN curves, and theoretical QLN curves derived from the pre-processed, measured QLN curves for both upstream and downstream and for various types of impairments with severity values distributed in the range from 0 to 1 per impairment. In the first step, i.e., step 521 of FIG. 5D, the weights of the various layers of the neural network are initialized. After initialization, the obtained trained data is processed iteratively. At each iteration, the neural network 130 obtains in step 522 a set of QLN curves for a respective impairment. The obtained set comprising at least one measured QLN curve and two theoretical QLN curves derived as detailed above with reference to FIG. 3C. The QLN curves are processed 523 by the neural network. Similarly to above, the QLN curves are processed as a stacked input by the respective convolution layers. At each convolutional layer, the obtained QLN curves are essentially downsampled to obtain the common features observed in the respective QLN curves. The common features are then further processed by the FC layers to obtain a prediction of the severity of the impairment, i.e., a pair of severity values for upstream and downstream, which reflects the severity of the impairment patterns captured in the far-end noise. The obtained pair of severity scores is then compared by the control logic with the expected values. The control logic computes in step 524 of FIG. 5D a loss factor to minimize the error between the predicted severity and the expected severity. Minimizing the error enforces a more accurate extraction of the common features from the QLN curves.

Herein, the root mean square error, RMSE, is used as the error computation method and optimization parameter defined as follows:

$$RMSE_{batch}=\text{sqrt}\sqrt{\mu_{batch}(a_{\text{predicted}}-a_{\text{target}})^2},$$

where $a_{predicted}$ is the predicted severity pair and $a_{target}$ is the expected severity pair, and $\mu_{batch}$ is reflects the mean of the difference between the predicted and the expected severity for the training data set.

At each iteration, the control logic outputs 526 an updated set of weights in the form of a gradient vector to update 527 or correct the weights of the respective layers of the neural network. The process is repeated until the neural network meets the stop condition 525, i.e., until the neural network is able to identify the severity of the impairment with sufficient precision. This marks the completion 528 of the training. Once the neural network is capable to correctly identify the severity of a certain type of impairment, i.e., once the training of the neural network is completed, a dispersion values for the upstream and downstream for each impairment type are empirically derived. The dispersion values quantify the global accuracy or precision of the predicted impact of the impairment, i.e., the global accuracy of the predicted severity.

The dispersion values may be stored in the local memory of the apparatus or an external memory in the form of a look-up table or a database. In the FIG. 1B, the dispersion values for the respective impairment types are stored in the local memory 142 of the apparatus 100 in the form of a database. Storing the dispersions allows as detailed above with reference to FIG. 5B calculating error margins associated with the predicted severity and thus providing a more complete report to the technician serving the wired network.

To accelerate the training of the learning model and its prediction accuracy, the inputs for the respective layers of the neural network are normalized to bring their respective inputs and outputs values in the same range. For the experiments, the input QLN curves made of 512 tones ranging from 0 to −150 dB with the output of the respective layer were scaled and normalized with the range of [0.0 to 1.0], so that the output of the neural network, i.e., the severity values, range from 0.0 to 1.0.

To search for the best learning model topology and hyper-parameters such as channels, filter or kernel sizes, pooling ratio, and so, a genetical optimization has been implemented. This allows to efficiently find a suitable model presenting high-performances. This genetical approach takes ranges of possible values for every hyper-parameter, selects at random one value for every parameter in its respective range, and tests the resulting topology. It repeats this operation multiple times, building so a set of a configurable number of different topologies. It then selects the best topologies in terms of final performances, builds new topologies on the same principle to reach the right number of needed topologies, and proceed to the same operation a given number of generations, selecting generation after generation the topologies reaching the best performances until the final identification of the best one.

During the genetic optimization, the following ranges of parameter per convolution layer were considered in the experiments:

number of filters in the range of [4 ... 28] with an incremental step of 4
a kernel size in the range of [2 ... 66] with an incremental step of 2
length of stride fixed to 1
pooling strategy set at 'maximum' vs 'average'
pooling filter size in the range of [2 ... 66] with an incremental step of 2

For the fully connected layers, the number of neurons considered per FC layer were in the range of [512 ... 2560] with an incremental step of 512.

The genetic optimization resulted in an optimally performing neural network topology with two convolutional layers followed by one fully connected layer with the following characteristics:

Number of Filters of $1^{st}$ Convolution layer=12
kernel size of $1^{st}$ Convolution layer=2
Stride of $1^{st}$ Convolution layer=1
Pooling type of $1^{st}$ Convolution layer='average'
Pooling filter size of $1^{st}$ Convolution layer=2
Number of Filters of $2^{nd}$ Convolution layer=8
kernel size of $2^{nd}$ Convolution layer=36
Stride of $2^{nd}$ Convolution layer=1
Pooling type of $2^{nd}$ Convolution layer='average'
Pooling filter size of $2^{nd}$ Convolution layer=18
Number of neurons of Fully Connected layer=512

This topology can be represented in a compact form as [12, 2, 2, 8, 36, 18, 512]. However, the neural network architecture is not limited to the above topology and parameter settings as neural network architectures with different topologies and/or different parameters settings may perform as well as the one specified above.

Multiple combinations of activation functions and weights initializations have been tested. Given that the neural network is aiming at solving a regression problem, the activation function of the last fully connected layer is classically a sigmoid function, while a ReLu activation function is used for the convolutional layers are chosen which performs well when solving the vanishing or exploding gradients problem. Further, for the weights initializations, HeNormal was selected for the CL layers and GlorotNormal for the FC layers.

Referring back to FIG. 1B and FIG. 2, the preparation module 120 may optionally trigger the operation of the neural network module 130, i.e., the execution of steps 215 and 216, only if a certain level of far-end cross talk, FEXT, is observed. To do so, the sub-module 121 of FIG. 1B, e.g., checks if the FEXT 25 provided by the pre-processing module 110 satisfies a predetermined value, and, if so, it triggers the operation of the neural network module 130 by means of the check signal 37. Crosstalk is the coupling of energy between two or more adjacent lines, and far-end crosstalk, FEXT, is the coupling between two or more lines when a signal propagates from the transmit end of a line to the receiving end of the line. In other words, the FEXT represents the coupling between a line and one or more disturbers, i.e., its neighboring lines reflect the amount of power emitted by the disturbers and captured by the line. This captured external power then amplifies the effects of impairment patterns even when the line is quiet, i.e., when no data is exchanged over the line and, hence, no power injected on it. The higher the FEXT, the stronger the impact of an impairment on the measured noise power spectral density of the line, and, hence, the better the predictions of the learning model. Exploiting this observation, allows triggering the neural network module, only when it is expected to obtain an accurate localization for the impairment. From simulation results, it has been observed that the learning model is capable of predicting the location of impairments with high accuracy for FEXT at levels equal to an above 100, i.e., FEXT >100 dB. This predetermined value, i.e. 100 dB, is a configurable parameter that can be stored in the local memory of the apparatus and can be modified by the operator of the wired network to control the number of the detected impairments but at the cost of lower or higher accuracy.

Further, the preparation module 120 may optionally trigger the operation of the neural network module 130, i.e., the execution of steps 215 and 216, only in the presence of impairment on one or more lines. To do so, the sub-module 121 of FIG. 1B, e.g., verifies if the relevance factor of an impairment provided by the pre-processing module 110 indicates a possible impairment on the line, and if so it triggers the neural network module 130 to determine the location of the impairment. For example, if the pre-processing module 110 outputs a relevance factor (not shown in the figure) indicating that no impairment has been detected based on the measured channel frequency response, i.e., HLOG, then the preparation module 120 will not trigger the operation of the neural network module 130 as the value of the relevance factor is below a predetermined threshold value.

Furthermore, the preparation module 120 may optionally trigger the neural network module 130 only for impairments that are not easily localizable by conventional means. For example, impairments such as single, multiple, or partial bridged taps, full or partial capacitive couplings are not easily localizable using conventional techniques, while impairments such as missing splitters or tool long loops are by nature well localizable using for example Single Ended Loop Testing, SELT. In such cases, the pre-processing module 110 may be set to output a relevance factor with a value of zero for impairments localizable by conventional means and a value of one for all other impairments. This way, the preparation module 120 may trigger the operation of the neural network module 130 only when required.

Although, the apparatus and the methods above have been described with reference to any DSL technology, such as VDSL2, VDSL8, VDSL12, ... , VDSL35 or even higher and as such is not limited to a given spectral or technology. Further, as the present solution is based on channel and noise carrier data, the described solution may be applied to any technologies employing discrete multi-tone, DMT, modulation such as G.fast or G.mgfast. The solution may thus be applied in the context of not only copper cables, but also coaxial cables, for example. To do so, the copper parametrized cable model needs to be replaced by a coaxial parameterized cable model for the neural network module 130 to be trained properly. Furthermore, the present approach is not limited to the impairment types described above. The learning model may be trained for any type of impairment. In case, a new type of impairments is identified in the future or if existing impairments are refined and split into sub-categories, the learning model implemented by the neural network module 130 needs to be simply re-trained to take these into account.

Figure 6:
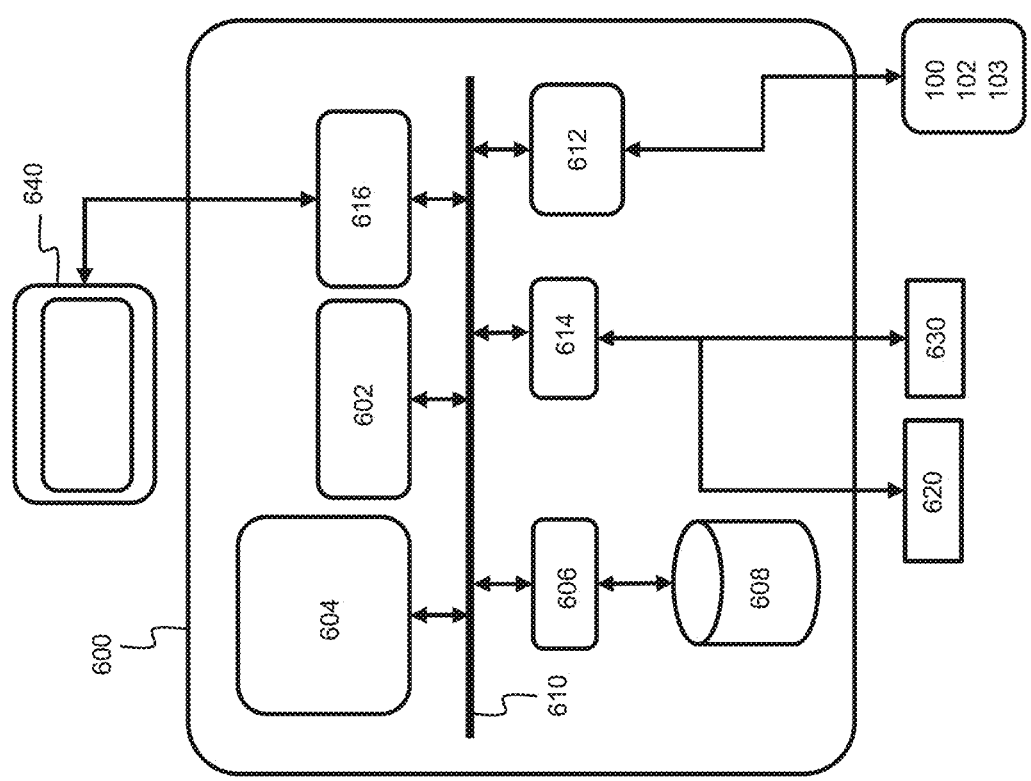
FIG. 6 shows an example embodiment of a suitable computing system for performing one or several steps in embodiments of the invention.

FIG. 6 shows a suitable computing system 600 enabling to implement embodiments of the method for localizing impairment according to the present disclosure. Computing system 600 may, in general, be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or a read-only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition, and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 651, 652, 653. The communication interface 612 of computing system 600 may be connected to such another computing system by means of a local area network, LAN, or a wide area network, WAN, such as for example the internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example, SATA disk drives, and control the reading and writing of data to and/or from these storage elements 608. Although the storage element(s) 608 above is/are described as a local disk, in general, any other suitable computer-readable media such as a removable magnetic disk, optical storage media such as a CD or DVD, -ROM disk, solid state drives, flash memory cards, . . . could be used. Computing system 600 could thus correspond to the apparatus 100 in the embodiments illustrated by FIG. 1A and FIG. 1B.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An apparatus comprising:
at least one processor; and
at least one memory including computer program code, the at least one memory and the computer code configured to, with the at least one processor, cause the apparatus at least to perform,
obtaining a measured channel frequency response, and a measured noise power spectral density for a line of a wired network susceptible to an impairment;
deriving, in case of an indication of an impairment present on the line, from the measured channel frequency response and the measured noise power spectral density, a first theoretical noise representation for the line with the impairment and a second theoretical noise representation for the line without the impairment; and
determining information indicative of a location of the impairment in the line, by processing the measured noise power spectral density, the first theoretical noise representation, and the second theoretical noise representation with a neural network.

2. The apparatus according to claim 1, wherein the at least one memory and the computer code are further configured to, with the at least one processor, cause the apparatus at least to perform
deriving a far-end crosstalk based on the measured noise power spectral density, and determining the information indicative of a location of the impairment is performed in response to the far-end crosstalk being equal or above a predetermined value.

3. The apparatus according to claim 1, wherein the at least one memory and the computer code are further configured to, with the at least one processor, cause the apparatus at least to
perform receiving a transmit power, and
perform the deriving of the first and the second theoretical noise representation by taking into account the transmit power.

4. The apparatus according to claim 1, wherein the at least one memory and the computer code are further configured to, with the at least one processor, cause the apparatus at least to
perform deriving a length of the line based on the measured channel frequency response, and
perform the deriving of the first and the second theoretical noise representation by taking into account the length.

5. The apparatus according to claim 1, wherein the at least one memory and the computer code are further configured to, with the at least one processor, cause the apparatus at least to
perform deriving an ideal channel frequency response for the line based on the measured channel frequency response
perform the deriving of the second theoretical noise representation by taking into account the ideal channel frequency response, and
perform the deriving of the first theoretical noise representation taking into account the measured channel frequency response.

6. The apparatus according to claim 1,
wherein the measured channel frequency response comprises measured upstream and downstream channel frequency responses,
wherein the measured noise power spectral density comprises a measured upstream and downstream noise power spectral density, and
wherein the at least one memory and the computer code are further configured to, with the at least one processor, cause the apparatus at least to
perform deriving first upstream and downstream theoretical noise representation for the line with the impairment and a second upstream and downstream theoretical noise representation of the line without the impairment, and
perform the determining the information indicative of an impairment of the line based on the measured upstream and downstream noise power spectral density, the first theoretical upstream and downstream noise representation and the second theoretical upstream and downstream noise representation.

7. The apparatus according to claim 1, wherein the neural network is a convolutional neural network.

8. The apparatus according to claim 7, wherein the convolutional neural network comprises at least one convolutional layer configured for extracting features based on the measured noise power spectral density, the first theoretical noise representation and the second theoretical noise representation, and at least one fully connected layer configured for estimating the location of the impairment on the line based on the extracted features.

9. The apparatus according to claim 1, wherein the at least one memory and the computer code are further configured to, with the at least one processor, cause the apparatus at least perform
determining a type of the impairment based on the measured channel frequency response, and
deriving an error margin for the location based on the type of the impairment.

10. The apparatus according to claim 9, wherein the at least one memory and the computer code are further configured to, with the at least one processor, cause the apparatus at least to perform outputting the impairment type, the location of the impairment, and the error margin.

11. The apparatus according to claim 1, wherein the line comprises a DSL line, wherein said channel frequency response is a Hlog, and wherein said noise power spectral density is a quiet line noise, QLN.

12. The apparatus according to claim 1, wherein the at least one memory and the computer code are further configured to, with the at least one processor, cause the apparatus at least to perform:
obtaining a training set of measured noise power spectral density for lines of the wired network affected by at least one known impairment, a first set of theoretical noise representations for the lines with the at least known impairment and a second set of theoretical noise representations for the lines without the at least one known impairment; and
training learning model implemented by the neural network for predicting a location of the at least one known impairment on the line, based on the training set of measured noise power spectral density, the first set of theoretical noise representation and the second set of theoretical noise representation.

13. A method comprising:
obtaining a measured channel frequency response and a measured noise power spectral density for a line of a wired network affected by an impairment;
deriving, in case of an indication of an impairment present on the line, from the measured channel frequency response and the measured noise power spectral density, a first theoretical noise representation for the line with the impairment and a second theoretical noise representation for the line without the impairment; and
determining information indicative of a location of the impairment in the line by processing the measured noise power spectral density, the first theoretical noise representation, and the second theoretical noise representation with a neural network.

14. A non-transitory computer readable storage medium comprising computer-executable instructions, which when executed by a computer, causes the computer to perform:
obtaining a measured channel frequency response and a measured noise power spectral density for a line of a wired network affected by an impairment;
deriving, in case of an indication of an impairment present on the line, from the measured channel frequency response and the measured noise power spectral density, a first theoretical noise representation, for the line with the observed impairment and a second theoretical noise representation for the line without the observed impairment; and
determining information indicative of a location of the observed impairment in the line by processing the measured noise power spectral density, the first theoretical noise representation, and the second theoretical noise representation with a neural network.

* * * * *

UNITED STATES PATENT AND TRADEMARK OFFICE
CERTIFICATE OF CORRECTION

| | |
|---|---|
| PATENT NO. | : 11,996,907 B2 |
| APPLICATION NO. | : 17/858882 |
| DATED | : May 28, 2024 |
| INVENTOR(S) | : Olivier Delaby et al. |

It is certified that error appears in the above-identified patent and that said Letters Patent is hereby corrected as shown below:

In the Claims

Column 24, Line 26 Claim 12, should read:
12. The apparatus according to claim 1, wherein the at least one memory and the computer code are further configured to, with the at least one processor, cause the apparatus at least to perform:
- obtaining a training set of measured noise power spectral density for lines of the wired network affected by at least one known impairment, a first set of theoretical noise representations for the lines with the at least known impairment and a second set of theoretical noise representations for the lines without the at least one known impairment; and
- training a learning model implemented by the neural network for predicting a location of the at least one known impairment on the line, based on the training set of measured noise power spectral density, the first set of theoretical noise representation and the second set of theoretical noise representation.

Signed and Sealed this
Second Day of July, 2024

Katherine Kelly Vidal
*Director of the United States Patent and Trademark Office*